(12) United States Patent
Son et al.

(10) Patent No.: US 9,821,303 B2
(45) Date of Patent: Nov. 21, 2017

(54) PHOTOCATALYST USING SEMICONDUCTOR-CARBON NANOMATERIAL CORE-SHELL COMPOSITE QUANTUM DOT AND METHOD FOR PREPARING THE SAME

(71) Applicant: KOREA INSTITUTE OF SCIENCE AND TECHNOLOGY, Seoul (KR)

(72) Inventors: Dong Ick Son, Jeollabuk-do (KR); Jong Hyeok Park, Suwon-si (KR); Su Kang Bae, Jeollabuk-do (KR); Jung Kyu Kim, Seongnam-si (KR); Gee Woo Chang, Seoul (KR)

(73) Assignee: KOREA INSTITUTE OF SCIENCE AND TECHNOLOGY, Seoul (KR)

(*) Notice: Subject to any disclaimer, the term of this patent is extended or adjusted under 35 U.S.C. 154(b) by 227 days.

(21) Appl. No.: 14/640,816

(22) Filed: Mar. 6, 2015

(65) Prior Publication Data
US 2016/0144348 A1 May 26, 2016

(30) Foreign Application Priority Data

Nov. 20, 2014 (KR) .................. 10-2014-0162582

(51) Int. Cl.
*H01L 51/46* (2006.01)
*B01J 35/00* (2006.01)
(Continued)

(52) U.S. Cl.
CPC ............ *B01J 35/004* (2013.01); *B01J 21/18* (2013.01); *B01J 23/06* (2013.01); *B01J 23/22* (2013.01);
(Continued)

(58) Field of Classification Search
CPC ............ H01L 31/0296; H01L 51/4233; H01G 9/2054
(Continued)

(56) References Cited

U.S. PATENT DOCUMENTS

2011/0247693 A1* 10/2011 Brotzman ............ H01L 51/426
136/263

FOREIGN PATENT DOCUMENTS

KR WO 2013/051895 * 4/2013
KR 1020130070327 A 6/2013
(Continued)

OTHER PUBLICATIONS

Hegazy et al., Characterization of CdSe-nanocrystals used in semiconductors for aerospace applications: Production and optical properties, NRIAG Journal of Astronomy and Geophysics, vol. 3, Issue 1, pp. 82-87 (Jun. 2014).*

Wei Al, et al; "One-pot, aqueous-phase synthesis of graphene oxide functionalized with heterocyclic groups to give increased solubility in organic solvents", RSC Advances; vol. 3, No. 45, pp. 45-49; first published online Nov. 15, 2012.
(Continued)

*Primary Examiner* — Jayne Mershon
(74) *Attorney, Agent, or Firm* — Ladas & Parry LLP

(57) ABSTRACT

The present invention relates to a photocatalyst using a semiconductor-carbon nanomaterial core-shell composite quantum dot and a method for preparing the same, more particularly to a microparticle in which a semiconductor-carbon nanomaterial core-shell composite quantum dot is self-assembled using 4-aminophenol, capable of improving photoelectrochemical response and photoconversion efficiency when used as a photocatalyst or a photoelectrode of a photoelectrochemical device, a photoelectrochemical device using the same and a method for preparing the same.

20 Claims, 10 Drawing Sheets

Elongated light path

(51) Int. Cl.
- *B01J 23/06* (2006.01)
- *B01J 21/18* (2006.01)
- *B01J 23/22* (2006.01)
- *B01J 23/30* (2006.01)
- *B01J 23/745* (2006.01)
- *B01J 31/00* (2006.01)
- *H01G 9/20* (2006.01)
- *B01J 37/02* (2006.01)

(52) U.S. Cl.
CPC ............ *B01J 23/30* (2013.01); *B01J 23/745* (2013.01); *B01J 31/00* (2013.01); *B01J 35/0013* (2013.01); *B01J 35/0033* (2013.01); *B01J 37/0219* (2013.01); *H01G 9/2027* (2013.01); *H01G 9/2045* (2013.01)

(58) Field of Classification Search
USPC .................................................. 136/260, 265
See application file for complete search history.

(56) References Cited

FOREIGN PATENT DOCUMENTS

| KR | 102013113770 A | 10/2013 |
|---|---|---|
| KR | 10-1351336 B1 | 1/2014 |

OTHER PUBLICATIONS

Moshe Nahmany, et al; "Chemoselectivity in reactions of esterification", Org. Biomol. Chem. vol. 2, pp. 1563-1572, First published as an Advance Article on the web May 10, 2004.

Yuyu Bu, et al, "Dramatically enhanced photocatalytic properties of Ag-modified graphene-ZnO quasi-shell-core heterojunction composite material", RSC Advances, Oct. 2013, vol. 3, pp. 24118-24125.

Chun Xian Guo, et al., "Graphene Quantum Dots as a Green Sensitizer to Functionalize ZnO Nanowire Arrays on F-Doped SnO2 Glass for Enhanced Photoelectrochemical Water Splitting", Advanced Energy Materials, Published online Apr. 2013, vol. 3, pp. 997-1003.

Jung Kyu Kim, et al., "Synthesis of transparent meosporous tungsten trioxide films with enhanced photoelectrochemical response: application to unassisted solar water splitting", Energy & Environmental Science, published online Mar. 2011, vol. 4, pp. 1465-1470.

Akihiko Kudo, et al., "Heterogeneous photocatalyst materials for water splitting", Chemical Society Reviews, published online Nov. 2008, vol. 38, pp. 253-278.

Mingfei Shao, et al., "Hierarchical Nanowire Arrays Based on ZnO Core-Layered Double Hydroxide Shell for Largely Enhanced Photoelectrochemical Water splitting", Advanced Functional Materials, vol. 24, pp. 580-586.

\* cited by examiner

Graphene  4-Aminophenol  Dimethylformamide

PHOTOCATALYST USING SEMICONDUCTOR-CARBON NANOMATERIAL CORE-SHELL COMPOSITE QUANTUM DOT AND METHOD FOR PREPARING THE SAME

CROSS-REFERENCE TO RELATED APPLICATIONS

This application claims priority under 35 U.S.C. §119 to Korean Patent Application No. 10-2014-0162582, filed on Nov. 20, 2014, in the Korean Intellectual Property Office, the disclosure of which is incorporated herein by reference in its entirety.

BACKGROUND (a) Technical Field

The present invention relates to a photocatalyst using a semiconductor-carbon nanomaterial core-shell composite quantum dot and a method for preparing the same, more particularly to a microparticle in which a semiconductor-carbon nanomaterial core-shell composite quantum dot is self-assembled using 4-aminophenol, capable of improving photoelectrochemical response and solar conversion efficiency when used as a photoelectrode of a photoelectrochemical device, a photoelectrochemical device using the same and a method for preparing the same.

(b) Background Art

Various methods and materials are being developed to solve environmental problems. Among them, a photocatalyst is advantageous in that it does not cause incidental pollution because it decomposes organic pollutants by using sunlight. The photocatalyst refers to "a material which facilitates a chemical reaction occurring in the presence of light, without being consumed". It accelerates the reaction using the light as an energy source. Typically, semiconductors, metal oxides or sulfur compounds are used as the photocatalyst. It is known that the photocatalyst can decompose various non-biodegradable materials that cannot be degraded by microorganisms. Materials exhibiting such photocatalytic effect include ZnO, $WO_3$, $SnO_2$, $ZrO_2$, $TiO_2$, etc.

Among the materials used as photocatalysts and photoelectrodes of photoelectrochemical devices, those exhibiting superior photocatalytic activity but very low solar energy conversion efficiency due to inability to absorb sunlight in the visible region owing to large bandgap energy include zinc oxide, titanium oxide, etc. However, because of their large bandgap energy, they cannot absorb the light in the visible region and can only absorb light in the UV region with wavelengths 400 nm or shorter. Accordingly, there is a limitation in improving solar energy conversion efficiency and the device performance is very poor.

To solve this problem, a method of growing a ZnO nanowire on an FTO (F-doped $SnO_2$)/glass substrate and then functionalizing the ZnO nanowire with a graphene quantum dot to improve the absorption efficiency of sunlight in the visible region was proposed [C. X. Guo et al., Graphene Quantum Dots as a Green Sensitizer to Functionalize ZnO Nanowire Arrays on F-Doped $SnO_2$ Glass for Enhanced Photoelectrochemical Water Splitting, *Adv. Energy Mater.*, 3, 997 (2013)]. Similarly, a method of growing a ZnO nanowire as a core on a substrate and then forming a CoNi shell to give a double-layered composite exhibiting improved photocatalytic performance was reported [M. Shao et al., Hierarchical Nanowire Arrays Based on ZnO Core-Layered Double Hydroxide Shell for Largely Enhanced Photoelectrochemical Water Splitting. *Adv. Funct. Mater.* 24, 580 (2013)].

In addition, there is a method of improving energy conversion efficiency by introducing a semiconductor material capable of absorbing sunlight in the visible region together with zinc oxide or titanium oxide [A. Kudo and Y. Miseki, Heterogeneous photocatalyst materials for water splitting. *Chem. Soc. Rev.* 38, 253 (2009)]. Additionally there is a method of improving light harvesting performance by introducing a semiconductor material capable of absorbing sunlight in visible region, but it has no choice but to be assisted by a photovoltaic device using tandem system in order to supply the required energy for water splitting [J. K. Kim et al., Synthesis of transparent mesoporous tungsten trioxide films with enhanced photoelectrochemical response: application to unassisted solar water splitting *Energy Environ. Sci.* 4, 1465 (2011)].

However, because these techniques apply two or more different materials to a device, the charge carriers generated from the sunlight absorption tend to recombine and be lost during the charge transport or charge transfer. As a result, it is difficult to achieve maximized energy conversion efficiency.

Meanwhile, as a method of improving photocatalytic activity by improving charge transport under limited sunlight absorption, a method of binding a composite material on a micrometer-scale graphene sheet is known [Y. Bu, Z. Chen, W. Li Dramatically enhanced photocatalytic properties of Ag-modified graphene-ZnO quasi-shell-core heterojunction composite material. *RSC Advances* DOI: 10.1039/c3ra44047h].

However, the improvement of charge transport is limited since the composite material contacts with an electrolyte over a large area because the graphene does not entirely surround the material. In addition, because many nanoparticles are attached to the graphene sheet, it is difficult to be prepared as a thin film and is not suitable for application to photoelectrochemical devices.

Called the next-generation dream material, graphene having a two-dimensional structure in which carbon atoms are arranged as a single layer exhibits excellent thermal conductivity, electron mobility and flexibility although it was less studied as compared to other nanocarbon materials such as carbon nanotube (CNT), fullerene, graphite, etc. For this reason, intense researches are focused on graphene.

In particular, use of materials exhibiting superior electrical properties, such as graphene or fullerene, can lead to significant improvement in charge transport and greatly improved durability by preventing photocorrosion. Also, graphene can be used as an electrode material for secondary batteries, supercapacitors, solar cells, etc. and, particularly, is useful as an additive for a charge transport layer and an active layer of a solar cell because of high charge mobility. In addition, since graphene has its own specific electrical properties with both metallic and semi-conductive properties and has a planar structure with a large specific surface area, it is recently drawing attention for use in transparent electrodes, electrochemical devices, supporting media for the catalysts, etc. Graphene exhibits different properties depending on the number of layers forming it. A multi-layer graphene is reported to exhibit semiconductive properties and help formation of nanosized crystals when bound to metal or metal oxide. Thus, it is studied a lot for use as a supporting media for the photocatalysts. However, since preparation of pure graphene is limited in terms of production cost and efficiency, use of graphene itself as a supporting media for the catalysts is impractical.

Accordingly, there is a need of the development of a new photocatalyst material which exhibits maximized photocatalytic performance and performs in the visible region in the field of environmental technology and energy technology.

Korean Patent Publication No. 2013-0113770 proposes a hybrid photocatalyst nanoparticle having improved photoactivity and a method for preparing the same and Korean Patent Publication No. 2013-0070327 describes a method of manufacturing a graphene sheet which is combined with a titanium dioxide nanorod and application thereof as a photocatalyst responding to visible light.

However, these techniques are also limited in maximizing photocatalytic performance and application for the visible region.

REFERENCES OF THE RELATED ART

Patent Documents (Patent document 1) Korean Patent Publication No. 2013-0113770.
(Patent document 2) Korean Patent Publication No. 2013-0070327.

Non-Patent Documents (Non-patent document 1) C. X. Guo et al., Graphene Quantum Dots as a Green Sensitizer to Functionalize ZnO Nanowire Arrays on F-Doped $SnO_2$ Glass for Enhanced Photoelectrochemical Water Splitting, *Adv. Energy Mater.*, 3, 997 (2013).
(Non-patent document 2) M. Shao et al., Hierarchical Nanowire Arrays Based on ZnO Core-Layered Double Hydroxide Shell for Largely Enhanced Photoelectrochemical Water Splitting. *Adv. Funct. Mater.* 24, 580 (2013).
(Non-patent document 3) A. Kudo and Y. Miseki, Heterogeneous photocatalyst materials for water splitting. Chem. Soc. Rev. 38, 253 (2009).
(Non-patent document 4) J. K. Kim et al., Synthesis of transparent mesoporous tungsten trioxide films with enhanced photoelectrochemical response: application to unassisted solar water splitting *Energy Environ. Sci.* 4, 1465 (2011).
(Non-patent document 5) Y. Bu, Z. Chen, W. Li Dramatically enhanced photocatalytic properties of Ag-modified graphene-ZnO quasi-shell-core heterojunction composite material. *RSC Advances* DOI: 10.1039/c3ra44047h.

SUMMARY

In order to satisfy the above-described needs, the present invention aims at maximizing photocatalytic performance by increasing light absorption and charge conductance as compared to the existing quantum dots and improving the characteristics of a photocatalyst so that photocatalytic activity and photoelectrochemical response can be enhanced.

Accordingly, the present invention is directed to providing a photocatalyst having improved photocatalytic activity and conversion efficiency.

The present invention is also directed to providing a photocatalyst prepared from a microparticle in which a semiconductor-carbon nanomaterial core-shell composite quantum dot is self-assembled using 4-aminophenol.

The present invention is also directed to providing a method for preparing a photocatalyst by synthesizing a microparticle through self-assembly of a semiconductor-carbon nanomaterial core-shell composite quantum dot using 4-aminophenol.

The present invention is also directed to providing a photoelectrochemical device including a microparticle in which a semiconductor-carbon nanomaterial core-shell composite quantum dot is self-assembled using 4-aminophenol as a photocatalyst and a method for preparing the same.

In an aspect, the present invention provides a photocatalyst including a microparticle in which a semiconductor-carbon nanomaterial core-shell composite quantum dot is self-assembled by 4-aminophenol.

In another aspect, the present invention provides a method for preparing a photocatalyst, including: preparing a semiconductor-carbon nanomaterial core-shell composite quantum dot as a single active layer as a solution; and preparing a microparticle through self-assembly by adding 4-aminophenol to the quantum dot.

In another aspect, the present invention provides a photoelectrochemical device wherein a microparticle in which a semiconductor-carbon nanomaterial core-shell composite quantum dot is self-assembled by 4-aminophenol is coated on an electrode substrate.

In another aspect, the present invention provides a photoelectrochemical device wherein a microparticle in which a semiconductor-carbon nanomaterial core-shell composite quantum dot is self-assembled by 4-aminophenol is coated on an electrode substrate as a photocatalyst.

In another aspect, the present invention provides a method for preparing a photoelectrochemical device, including: preparing a semiconductor-carbon nanomaterial core-shell composite quantum dot as a single active layer as a solution; preparing a microparticle through self-assembly by adding 4-aminophenol to the quantum dot; and coating the prepared microparticle on an electrode substrate.

Since the photocatalyst according to the present invention has a microparticle structure in which the semiconductor-carbon nanomaterial core-shell quantum dot is aggregated, unlike the existing metal oxide quantum dot or semiconductor-carbon nanomaterial core-shell quantum dot, it exhibits very superior photocatalytic performance.

In particular, since the present invention uses graphite, which is the most abundant in the earth, as a basic material of the metal oxide-carbon nanomaterial quantum dot, the material is inexpensive. In addition, the material suited for the green industry because it is environmentally unharmful. Furthermore, since the material consists of micrometer-sized particles wherein $sp^2$ carbons cover the surface of the inorganic semiconductor, it exhibits superior solubility and can facilitate the solution process or other device-manufacturing processes.

Moreover, since the nanocarbon structure as the basic structure of the photocatalyst according to the present invention surrounds the inorganic semiconductor, it facilitates charge extraction from the inorganic semiconductor better than the existing graphene-inorganic semiconductor composite. Also, since the area where the semiconductor directly contacts with an electrolyte is decreased, the reaction, whereby the electrons and holes produced from absorption of sunlight are annihilated through recombination, can be reduced greatly. As a result, the charge transport performance outstandingly increases and the photocatalytic activity and photoelectrochemical response are also improved.

Furthermore, scattering of sunlight occurring inside the spherical microparticle formed from the self-assembly of the quantum dot caused by the refractive index of the semiconductor material which is the core of the quantum dot leads to elongated light path of the sunlight, thereby improving solar energy absorption by the semiconductor material and significantly increasing solar conversion efficiency. In addition, since the charge carriers can be transported to the nanocarbon structure quickly and effectively, device efficiency can be improved greatly.

Besides, since the semiconductor material as the core of the photocatalyst according to the present invention can be replaced by other metal oxide and various functionalities can be provided depending on the material, structure and size, such as a 0D nanosized quantum dot, a 1D nanowire or a nanotube, and a 2D nanosheet, etc. Accordingly, the microparticle exhibits very superior photocatalytic performance and can be widely used industrially for photoelectrochemical devices, and solar cells, etc.

DETAILED DESCRIPTION

Figure 1:
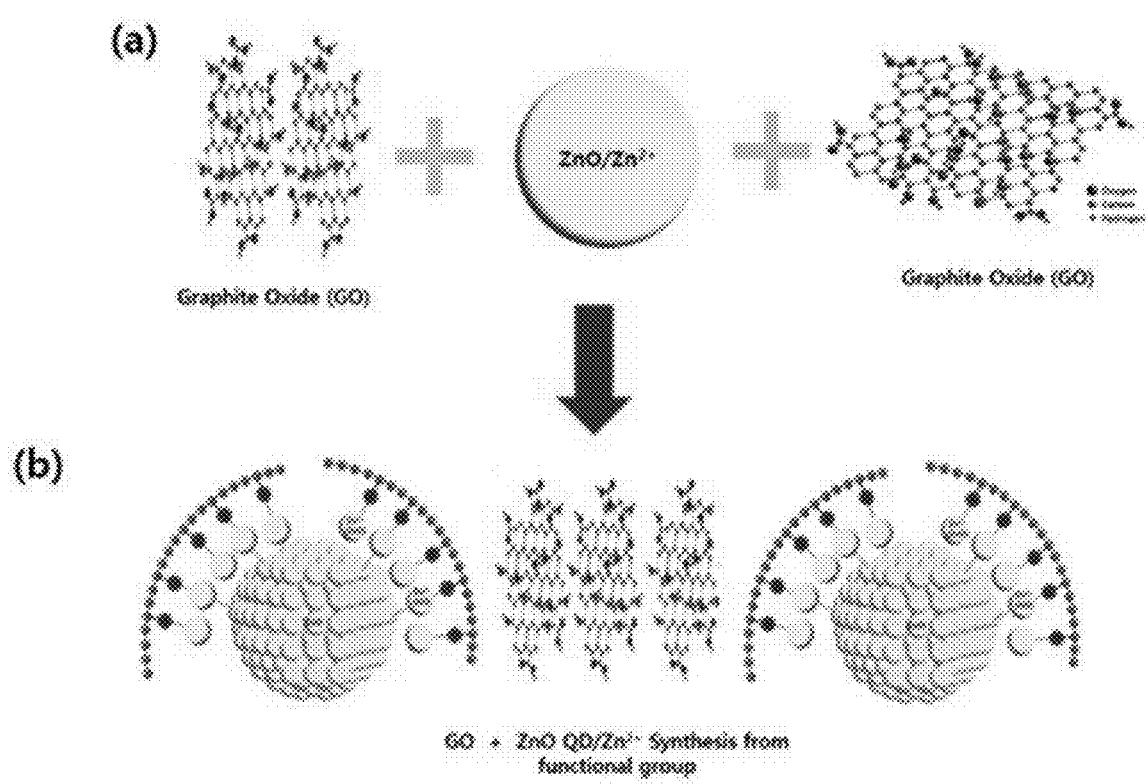
FIG. 1 schematically shows a procedure whereby a zinc oxide-graphene core-shell quantum dot is prepared using graphite oxide (GO) and zinc oxide according to the present invention and the resulting quantum dot.

Hereinafter, exemplary embodiments of the present invention will be described in more detail.

The present invention relates to a method of improving photocatalytic and photoelectrochemical properties by using a material wherein a semiconductor nanoparticle core is surrounded by a nanocarbon structure including a carbon nanomaterial as a shell for a photocatalyst or a photoelectrochemical device and thereby enhancing charge transport.

In an exemplary embodiment of the present invention, a metal oxide or a cadmium compound may be used as the semiconductor. Specifically, the semiconductor may be selected from $ZnO$, $WO_3$, $SnO_2$, $ZrO_2$, $TiO_2$, CdS, CdSe and CdTe. More specifically, a metal oxide selected from $ZnO$, $WO_3$, $SnO_2$, $ZrO_2$, $TiO_2$, etc. may be used. Most specifically, $ZnO$, $TiO_2$, etc. may be used.

In an exemplary embodiment of the present invention, the carbon nanomaterial may be selected from graphene, multi-layered graphene, carbon nanotube and fullerene. More specifically, graphene may be used.

In the present invention, a quantum dot wherein the semiconductor as a core is surrounded by the carbon nanomaterial as a shell is used as a basic structure. The quantum dot may be constructed by a previously known method. In the present invention, a semiconductor-carbon nanomaterial core-shell quantum dot includes a nanoparticle having a semiconductor-carbon nanomaterial core-shell structure.

In the present invention, the microsphere composed of semiconductor-carbon nanomaterial core-shell quantum dot is formed by self-assembly by 4-aminophenol.

The 4-aminophenol used in the present invention is a white powder generally used as a developing agent. After the carboxylic acid group of graphene is activated above a certain temperature using DMF, the activated site forms an amide bond by reacting with the amine group of the 4-aminophenol. That is to say, the carboxylic acid group reacts with DMF to form an intermediate, which then forms an amide bond through nucleophilic acyl substitution by the amine group. Finally, the hydroxyl group remaining in the 4-aminophenol forms an ester bond through esterification with the carboxylic acid group of another graphene, thereby forming ZnO@graphene in the form of a microsphere. To conclude, the addition of the 4-aminophenol to the quantum dot leads to formation of a microparticle through self-assembly.

In an exemplary embodiment of the present invention, the microparticle structure may be prepared to have an average diameter of 1-3 μm. The size of the microparticle may be controlled with the amount of 4-aminophenol, temperature, time, etc.

In the present invention, the microparticle may further contain a visible light absorbing material selected from iron oxide, tungsten oxide, and a cadmium complex and bismuth vanadate. The visible light absorbing material may be contained in the microparticle in an amount of up to 20 wt %. If the content is excessive, performance problems such as charge recombination may occur.

In the present invention, each nanoparticle includes a semiconductor surrounded by a nanocarbon structure. For example, as the semiconductors as the core of the quantum dot, zinc oxide and titanium oxide having refractive indices of $n=2$ and $n=2.5$, respectively, at 600 nm may be used to prepare a photocatalyst including a self-assembled microparticle formed from a semiconductor-carbon nanomaterial core-shell composite quantum dot.

Since sunlight is scattered inside the microparticle structure of the photocatalyst and remains for a long time, light path is elongated. As a result, the chance and probability of the inorganic semiconductor absorbing solar energy are increased greatly and, accordingly, the solar conversion efficiency can be improved significantly. In addition, if a material capable of absorbing visible light, such as iron oxide, tungsten oxide, cadmium complex, bismuth vanadate, etc., is further introduced into the microparticle structure, the sunlight in the visible region can be utilized more effectively and a synergic effect can be expected in terms of solar conversion efficiency.

The self-assembled microparticle based on the semiconductor-carbon nanomaterial core-shell quantum dot structure may be prepared into a powder for use as a photocatalyst. In addition, the photocatalyst may be coated onto a transparent electrode as a thin film to prepare a photoelectrode of a photoelectrochemical device for producing hydrogen via a photoelectrochemical reaction or for removing pollutants.

Accordingly, the microparticle structure according to the present invention is very useful as a photocatalyst applicable, for example, to a photoelectrochemical device.

A mechanism by which the microparticle is synthesized from a semiconductor-carbon nanomaterial quantum dot and 4-aminophenol is as follows.

First, after the carboxylic acid group of graphene is activated above a certain temperature using, for example, dimethylformamide (DMF), the activated site forms an amide bond by reacting with the amine group of the 4-aminophenol. That is to say, the carboxylic acid group reacts with DMF to form an intermediate, which then forms an amide bond through nucleophilic acyl substitution by the amine group. Finally, the hydroxyl group remaining in the 4-aminophenol forms an ester bond through esterification with, for example, the carboxylic acid group of another graphene thereby forms a semiconductor-carbon nanomaterial microparticle.

In an exemplary embodiment of the present invention, the semiconductor-carbon nanomaterial quantum dot may be a mixture of different semiconductor-carbon nanomaterial quantum dots. For example, different metal oxides may form the core or a mixture of a cadmium compound and a metal oxide may be used. In addition, semiconductor-carbon nanomaterial quantum dots having shells formed of different carbon nanomaterials may be mixed to form the microparticle structure.

As described, the present invention provides a method for preparing a photocatalyst, including: preparing a semiconductor-carbon nanomaterial core-shell composite quantum dot as a single active layer as a solution; and preparing a microparticle through self-assembly by adding 4-aminophenol to the quantum dot.

In an exemplary embodiment of the present invention, before adding the 4-aminophenol, the carboxylic acid group of the carbon nanomaterial may be activated by adding dimethylformamide (DMF).

The present invention also provides a photoelectrochemical device wherein a microparticle in which a semiconductor-carbon nanomaterial core-shell composite quantum dot is self-assembled by 4-aminophenol is coated on an electrode substrate.

The photoelectrochemical device according to the present invention may be prepared by a method including: preparing a semiconductor-carbon nanomaterial core-shell composite quantum dot as a single active layer as a solution; preparing a microparticle through self-assembly by adding 4-aminophenol to the quantum dot; and coating the prepared microparticle on an electrode substrate.

Specifically, the electrode substrate may be an ITO or FTO substrates.

During the coating of the prepared microparticle on an electrode substrate, the microparticle may be prepared into a paste together with a binder and then heat-treated to prepare the photoelectrochemical device.

In accordance with the present invention, by surrounding the existing semiconductor, such as the metal oxide or the cadmium compound described above which exhibit superior photocatalytic performance but can be corroded by sunlight as referred to "photocorrosion", with the carbon nanostructure such as graphene, carbon nanotube or fullerene, and by using the same for a photoelectrochemical device or a photocatalyst, the performance and lifetime can be improved by enhancing charge transport and preventing sunlight-induced corrosion.

In particular, after the semiconductor material as the core absorbs sunlight and electrons and holes are produced, the carbon nanostructure as the shell, which has superior electrical properties, prevents photocorrosion of the semiconductor material by enhancing charge conductance. The transported charge participates in redox reactions with reactants in an electrolyte. The reactant is water in case of hydrogen production through water splitting and is a pollutant in case of photodegradation of pollutants. The core-shell structure of the present invention provides improved photoelectrochemical and photocatalytic performance as well as improved lifetime because the produced charge is not consumed for photocorrosion but is effectively transported to the shell.

As described, the present invention provides an inorganic semiconductor-carbon nanomaterial core-shell structure exhibiting improved long-term stability, photocatalytic activity, and photoelectrochemical performance. When a material exhibiting superior photocatalytic performance but causes environmental pollution and is harmful to human, such as a cadmium complex, is used as the core, the present invention can prevent such problems by inhibiting the release of the material.

And, when a material which is corroded by sunlight, such as zinc oxide or a cadmium complex, is used as the core, the present invention can greatly improve long-term stability and lifetime as the carbon nanostructure facilitates charge transport and thereby prevents the corrosion.

In addition, the present invention maximizes the photocatalytic effect by, rather than using the core-shell quantum dot as it is, preparing a microparticle structure.

As such, the photocatalyst prepared according to the present invention, which employs the carbon nanostructure exhibiting superior charge transport and electrical conductivity as the shell, allows the charge excited by sunlight at the semiconductor material as the core to be transported to the carbon nanostructure. The carbon nanostructure shell improves photoelectrochemical performance by enhancing charge separation and transport. In particular, as light path is elongated inside the spherical microparticle formed of the quantum dot having a refractive index n=2 or greater through maximized light scattering, the chance of utilizing the sunlight is increased and the solar conversion efficiency is enhanced. As a result, the photocatalytic activity is greatly improved. Accordingly, a photoelectrochemical cell prepared using the photocatalyst also exhibits superior solar conversion efficiency.

In the method for preparing a photoelectrochemical device according to the present invention, after the microparticle structure is coated on the electrode substrate, a photoelectrochemical reaction may be conducted in an aqueous electrolyte solution and the photocatalytic performance of the microparticle may be evaluated.

The present invention also provides a solar cell using the photocatalyst.

The present invention will be described in more detail through examples. However, the present invention is not limited by the examples.

Preparation Example 1: Preparation of Zinc Oxide Quantum Dot 0.93 g of zinc acetate dihydrate [$Zn(COO)_2 \cdot 2H_2O$] was added to 200 mL of N,N-dimethylformamide. After stirring for 10 minutes, a dispersion of graphite oxide and the zinc acetate dihydrate solution were mixed and stirred for 5 hours at 150 rpm while maintaining temperature at 95° C. The solution became transparent 30 minutes later and then became a turbid white solution 1 hour later. 5 hours later, a white powder was produced in a transparent solution. The powder was washed with ethanol and then with distilled water and dried slowly in an oven at 55° C. to obtain a zinc oxide quantum dot as a powder.

Preparation Example 2: Preparation of Zinc Oxide-Graphene Quantum Dot 40 mg of graphite oxide was dispersed in 40 mL of N,N-dimethylformamide for 10 minutes. And, 0.93 g of zinc acetate dihydrate [$Zn(COO)_2 \cdot 2H_2O$] was added to 200 mL of N,N-dimethylformamide and stirred. After stirring for 10 minutes, the dispersion of graphite oxide (GO) and the zinc acetate dihydrate solution were mixed and stirred for 5 hours at 150 rpm while maintaining temperature at 95° C. The resulting solution was initially black but became transparent 30 minutes later and then became a turbid white solution 1 hour later. 5 hours later, a white powder was produced in a transparent solution. The powder was washed with ethanol and then with distilled water and dried slowly in an oven at 55° C. to obtain a zinc oxide-graphene quantum dot as a powder.

FIG. 1 schematically shows a procedure whereby a zinc oxide-graphene core-shell quantum dot is prepared using graphite oxide (GO) and zinc oxide and the resulting quantum dot.

In FIG. 1, (a) shows that the acid-treated graphite oxide (GO) is formed as a single-layer graphene surrounding zinc oxide as a nanoparticle or a quantum dot.

In FIG. 1, (b) schematically shows the arrangement of the functional groups of the prepared zinc oxide-graphene core-shell quantum dot. Three types of chemical bonding between the single carbon layer and the outermost layer of the zinc oxide nanoparticle or quantum dot, i.e. the chemical bonding between the Zn ion and the epoxy, hydroxyl and carboxyl groups are schematically shown.

Example 1: Preparation of Microparticle in which Zinc Oxide-Graphene Core-Shell Quantum Dot is Self-Assembled and Photocatalyst Graphene oxide was prepared to prepare a zinc oxide-graphene core-shell quantum dot. 5 g of graphite powder was mixed with $H_2SO_4$ (86 mL)/$H_2O$ (90 mL)+$HNO_3$ (21 mL)/$H_2O$ (30 mL) and sonicated for about 1 hour. 5 days later, after centrifuging using DI water, moisture was removed by placing in an oven (80° C.) for 3-4 days. The prepared graphite oxide (GO) (400 mg) was added to dimethylformamide (400 mL) and sonicated for about 10 minutes. After adding zinc acetate dihydrate (18.4 g) to dimethylformamide (2 L), the zinc acetate dihydrate solution was added to the dispersion of GO in dimethylformamide and reaction was conducted for 5 hours under the condition of 140° C. and 270 rpm. 2 hours after the reaction was started, 4-aminophenol (914 mg) was added and then the reaction was continued for the remaining 3 hours. After the reaction was completed, the product was washed with ethanol and DI water for 10 times each using a centrifuge and then dried in an oven (80° C.) for 3-4 days to obtain a microparticle powder in which the zinc oxide-graphene core-shell quantum dot is self-assembled.

The prepared microparticle can serve as a photocatalyst for a photoelectrochemical device.

Figure 2A:
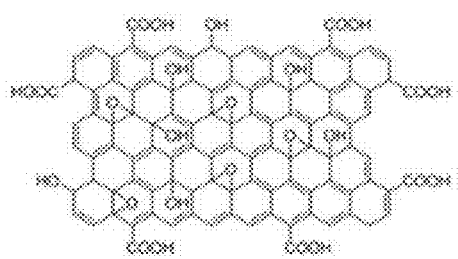
FIG. 2a shows the chemical structure of graphene as a shell of a quantum dot having a reactive functional group, which is used to prepare a microparticle from a zinc oxide-graphene quantum dot in Example 1 according to the present invention, 4-aminophenol and dimethylformamide (DMF).
Figure 2A:
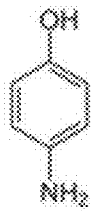
Figure 2A:
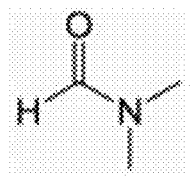

FIG. 2a shows the chemical structure of graphene as the shell of the quantum dot having a reactive functional group, which was used to prepare the microparticle from the zinc oxide-graphene quantum dot in Example 1, 4-aminophenol and dimethylformamide (DMF).

Figure 2B:
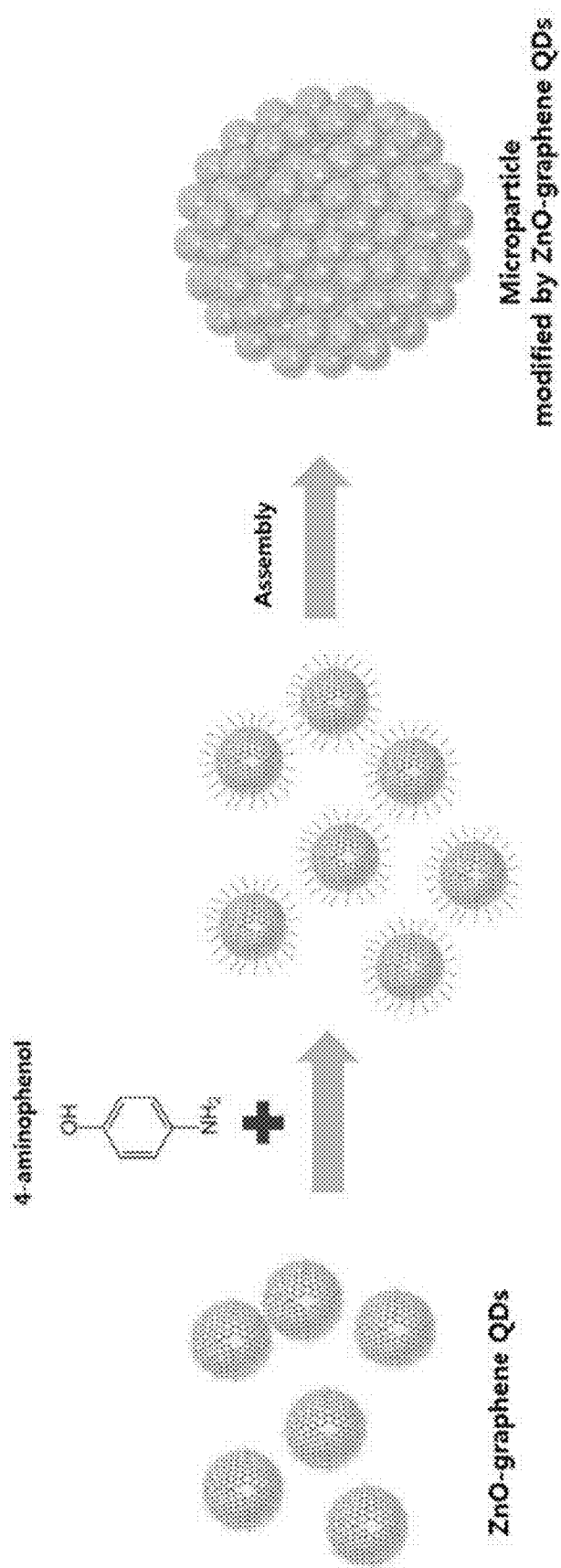
FIG. 2b schematically shows a procedure whereby a zinc oxide-graphene quantum dot surface-treated with 4-aminophenol forms a microparticle structure through self-assembly in Example 1 according to the present invention.

FIG. 2b schematically shows the procedure whereby the zinc oxide-graphene quantum dot surface-treated with the 4-aminophenol forms the microparticle structure through self-assembly in Example 1.

Figure 2C:
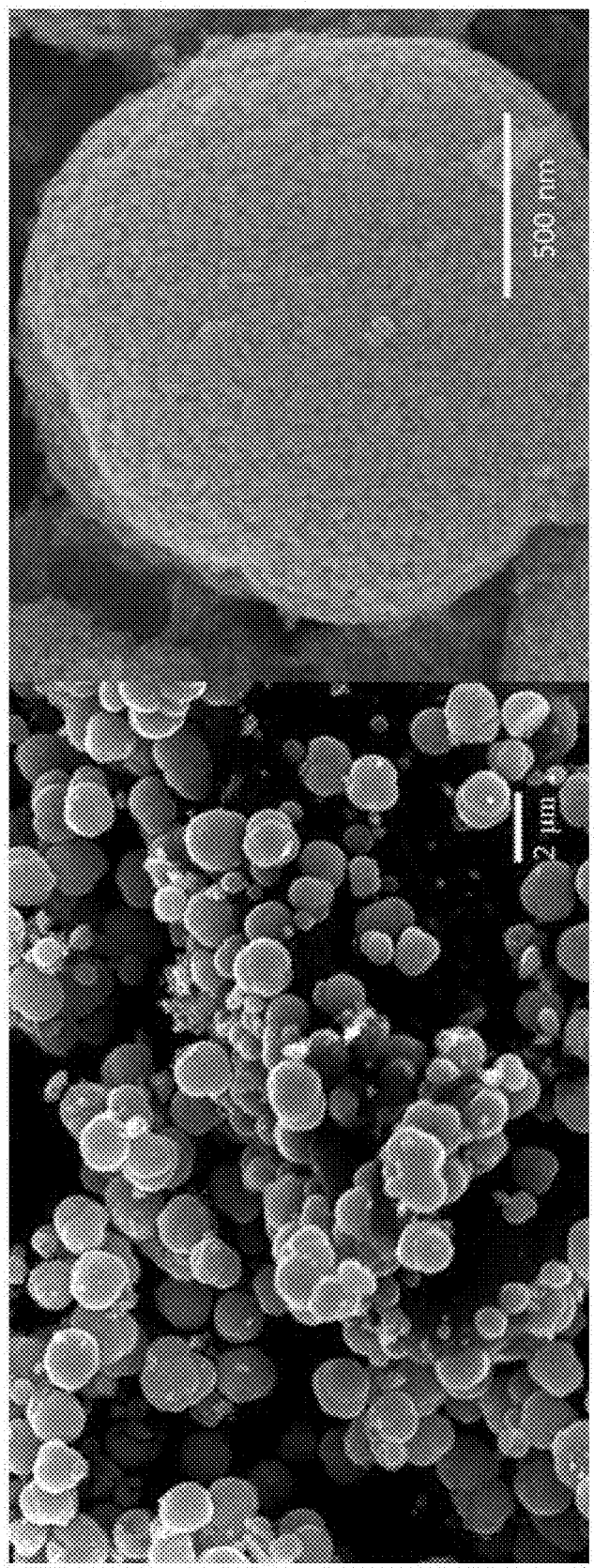
FIG. 2c shows a scanning electron microscopic (SEM) image of a microparticle synthesized from self-assembly of a zinc oxide-graphene quantum dot by 4-aminophenol in Example 1 according to the present invention.

FIG. 2c shows a scanning electron microscopic (SEM) image of the microparticle synthesized from self-assembly of the zinc oxide-graphene quantum dot by the 4-aminophenol in Example 1.

Figure 3A:
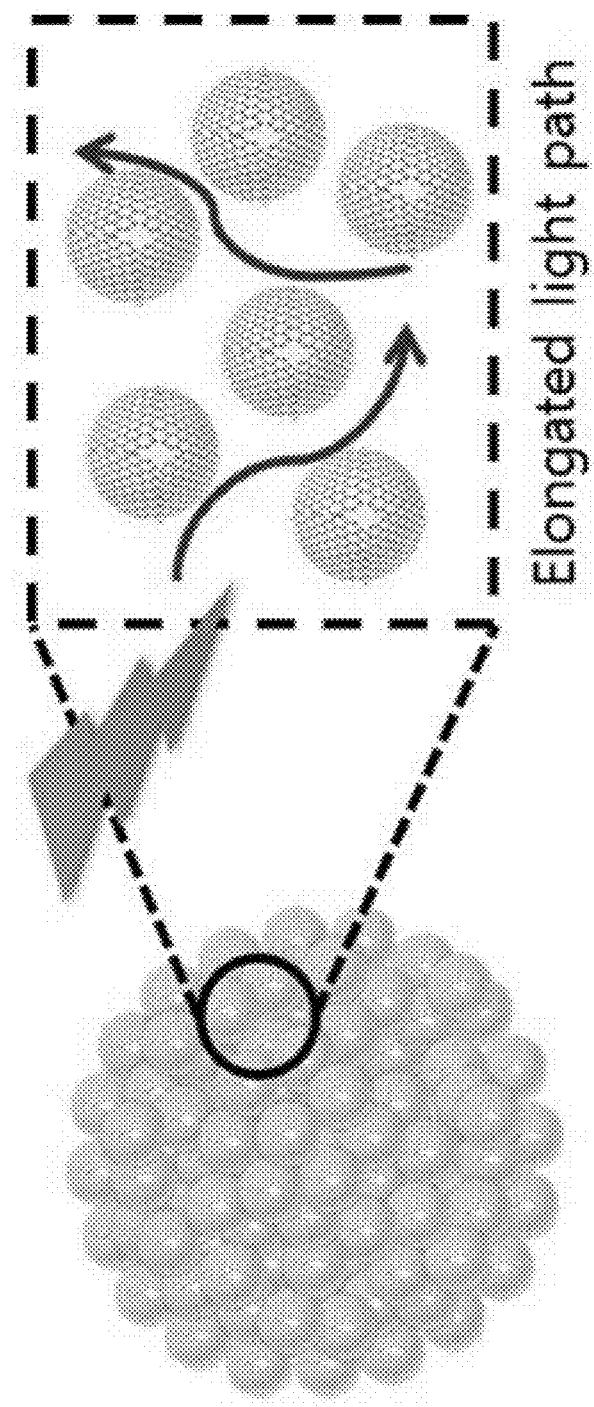
FIG. 3a schematically shows light scattering effect by a microparticle in which a semiconductor-carbon nanomaterial quantum dot is self-assembled, prepared in Example 1 according to the present invention, and elongated light path caused thereby.

FIG. 3a schematically shows light scattering effect by the microparticle in which the semiconductor-carbon nanomaterial quantum dot is self-assembled, which was prepared in Example 1, and elongated light path caused thereby.

Figure 3B:
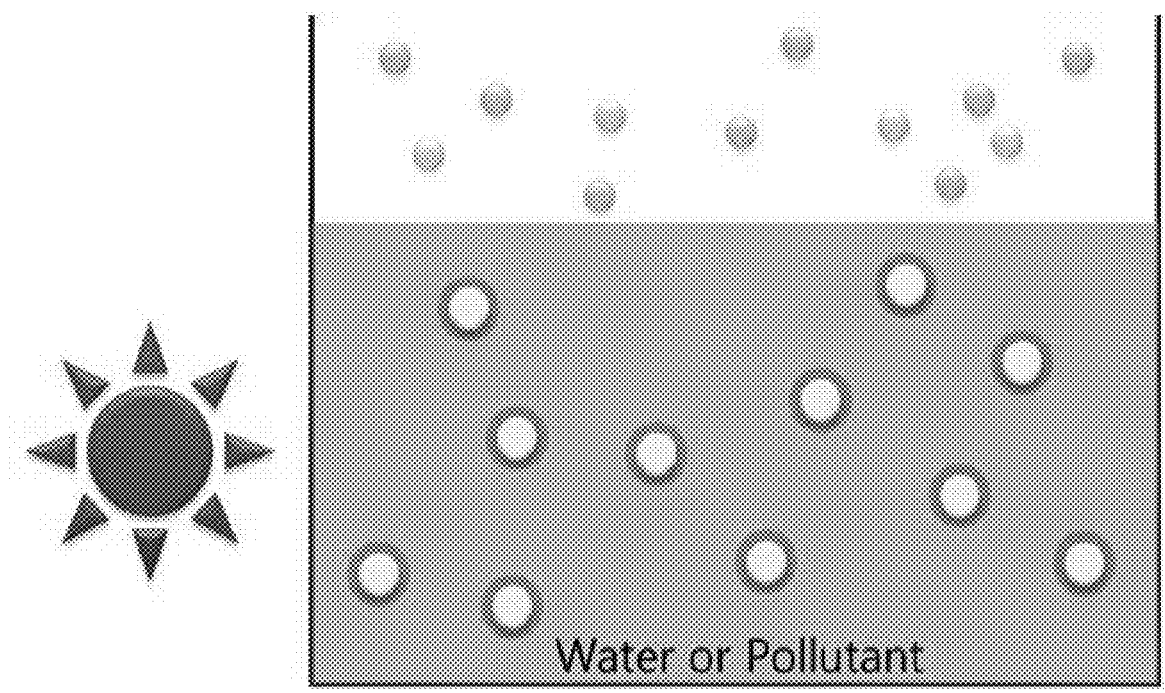
FIG. 3b schematically shows use of a microparticle structure in which a semiconductor-carbon nanomaterial quantum dot is self-assembled, prepared in Example 1 according to the present invention, as a photocatalyst.

FIG. 3b schematically shows use of the microparticle structure in which the semiconductor-carbon nanomaterial quantum dot is self-assembled, which was prepared in Example 1, as a photocatalyst.

Example 2: Preparation of Photoelectrochemical Device Using Zinc Oxide-Carbon Nanomaterial Microparticle A photoelectrochemical device was prepared using the semiconductor/carbon nanostructure core-shell microparticle sample prepared in Example 1.

Graphene and the microparticle sample were introduced on a transparent electrode substrate such as a glass coated with indium tin oxide or fluorine-doped tin oxide in the form of a film. As a binding material, 100 mg of ethyl cellulose was dissolved in 0.9 g of water and stirred after being mixed with 60 mg of the microparticle sample. 8 hours later, 300 mg of α-terpineol was mixed. After preparing into a paste by stirring for 24 hours, the paste was coated on the transparent electrode substrate by the doctor blade method. Then, a film was obtained by heat-treating at 300° C. for 3 hours.

A photoelectrochemical device was operated in an electrolyte using the prepared film as a photoelectrode. As the electrolyte, a material which does not react with zinc oxide and carbon nanostructure, such as $NaClO_4$ or $Na_2SO_4$, was used.

Figure 3C:
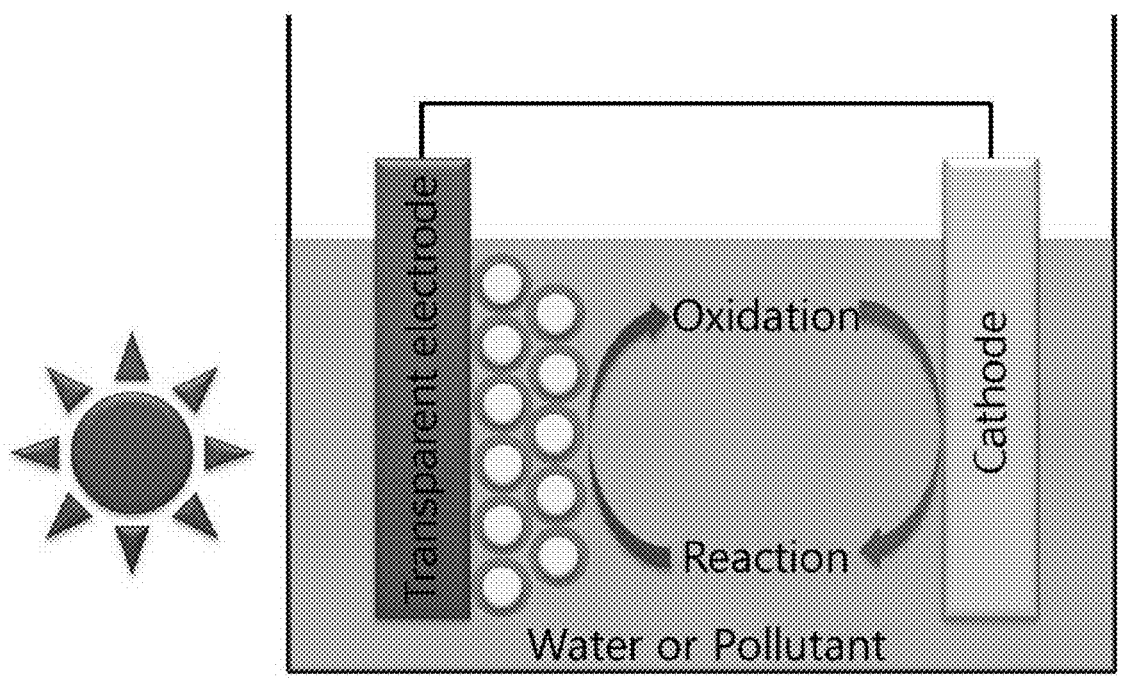
FIG. 3c schematically shows operation of a photoelectrochemical device using a microparticle structure in which a semiconductor-carbon nanomaterial quantum dot is self-assembled, prepared in Example 2 according to the present invention, in a photoelectrode.

FIG. 3c schematically shows operation of the photoelectrochemical device using the microparticle structure in which the semiconductor-carbon nanomaterial quantum dot is self-assembled, which was prepared in Example 2, in a photoelectrode.

Test Example 1: Investigation of Photocatalytic Activity of Microparticle in which Semiconductor-Carbon Nanomaterial Quantum Dot is Self-Assembled In order to investigate the improvement in scattering effect of a spherical microparticle structure based on the zinc oxide-carbon nanomaterial core-shell nanoparticle or quantum dot prepared in Example 1, diffuse reflectance was measured by the solid thin-film sample test method. The result is shown in FIG. 4.

Figure 4:
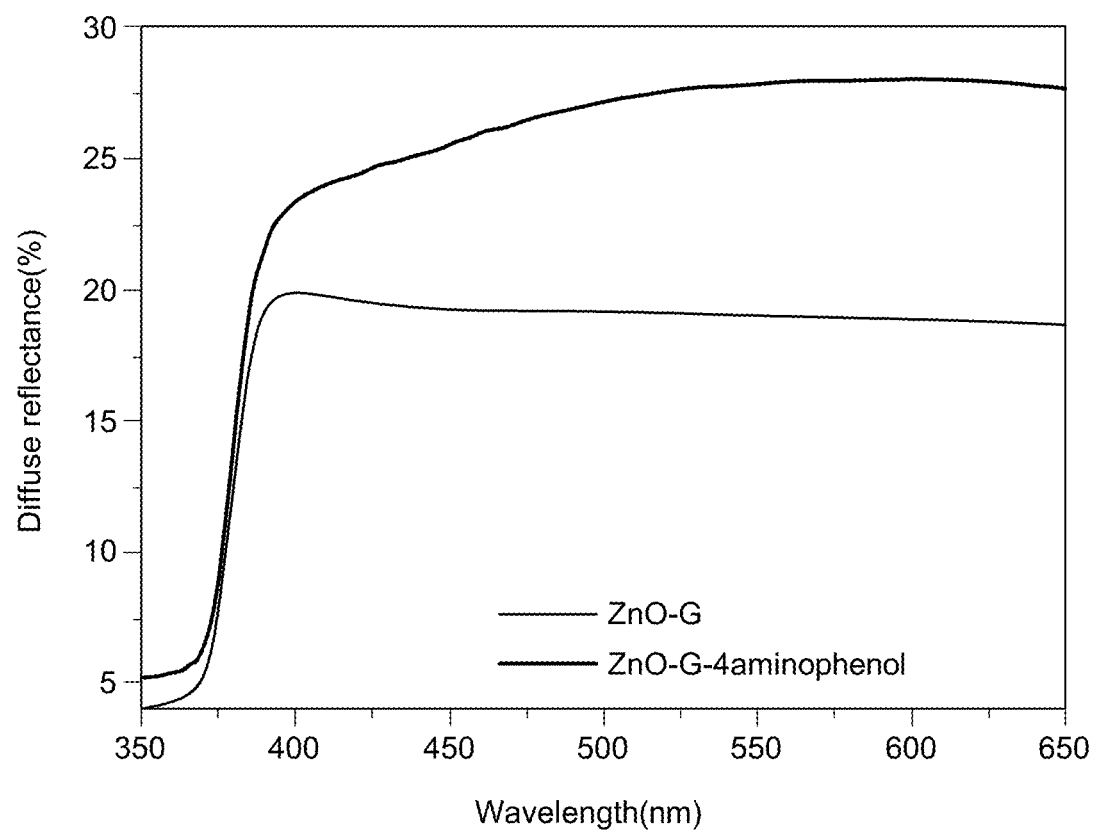
FIG. 4 shows a result of measuring diffuse reflectance to confirm that a zinc oxide-carbon nanomaterial composite nanoparticle prepared in Example 1 according to the present invention exhibits superior light scattering effect after self-assembly by surface treatment with 4-aminophenol.

From FIG. 4, it can be seen that the microparticle structure self-assembled through surface treatment with the 4-aminophenol exhibits superior sunlight scattering effect in all wavelength ranges as compared to the zinc oxide-carbon nanomaterial quantum dot.

Test Example 2: Investigation of Performance of Photoelectrochemical Device Wherein Microparticle in which Semiconductor-Carbon Nanomaterial Quantum Dot is Self-Assembled which is Introduced into a Photoelectrode as a Photocatalyst Various experiments were conducted to investigate the performance of the photoelectrochemical device prepared in Example 2.

First, photocurrent versus voltage was measured for the photoelectrochemical device prepared in Example 2 by the three-electrode method. The result is shown in FIG. 5a.

Figure 5A:
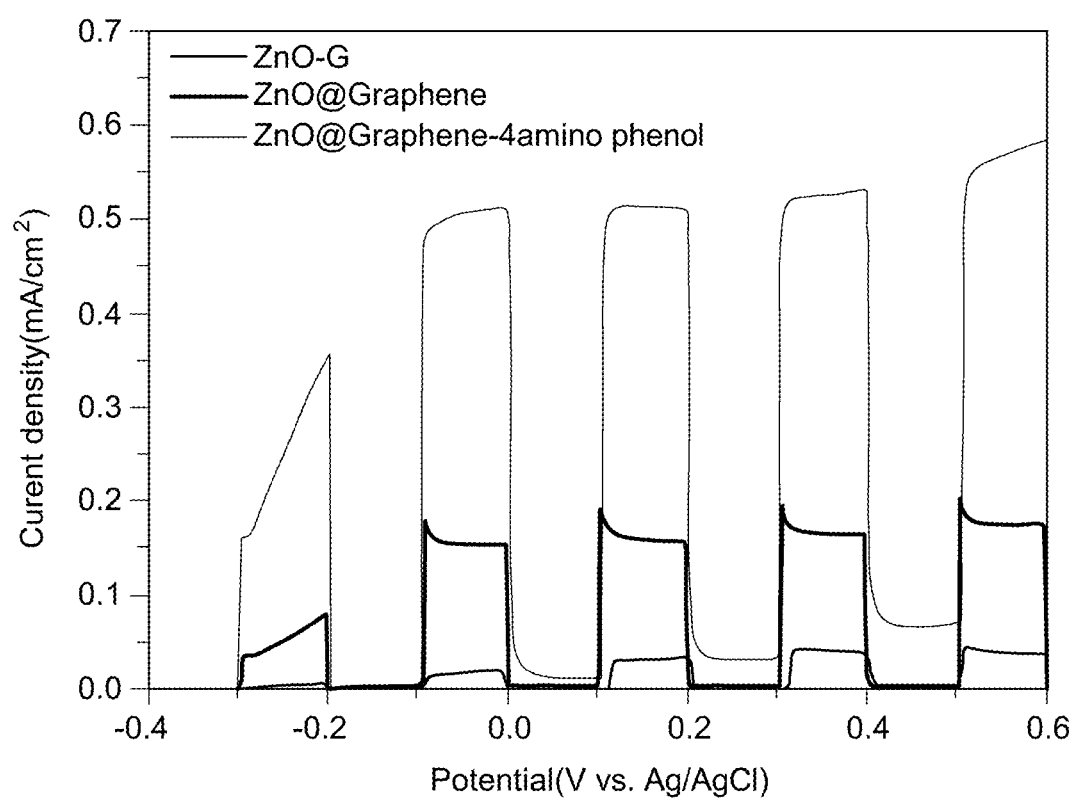
FIG. 5a shows a result of measuring photocurrent versus voltage for a photoelectrochemical device wherein a microparticle in which a semiconductor-carbon nanomaterial quantum dot is self-assembled, prepared in Example 2 according to the present invention, is introduced into a photoelectrode as a photocatalyst.

FIG. 5a shows a result of measuring photocurrent versus voltage for the photoelectrochemical device wherein the microparticle in which the semiconductor-carbon nanomaterial quantum dot is self-assembled was introduced into a photoelectrode. It can be seen that the zinc oxide-graphene core-shell structure exhibits higher photocurrent than zinc oxide and the microparticle structure treated with the 4-aminophenol exhibits higher photocurrent than the core-shell structure.

Also, photocurrent versus time was measured for the photoelectrochemical device prepared in Example 2 under a constant voltage of 0 V (vs. Ag/AgCl). The result is shown in FIG. 5b.

Figure 5B:
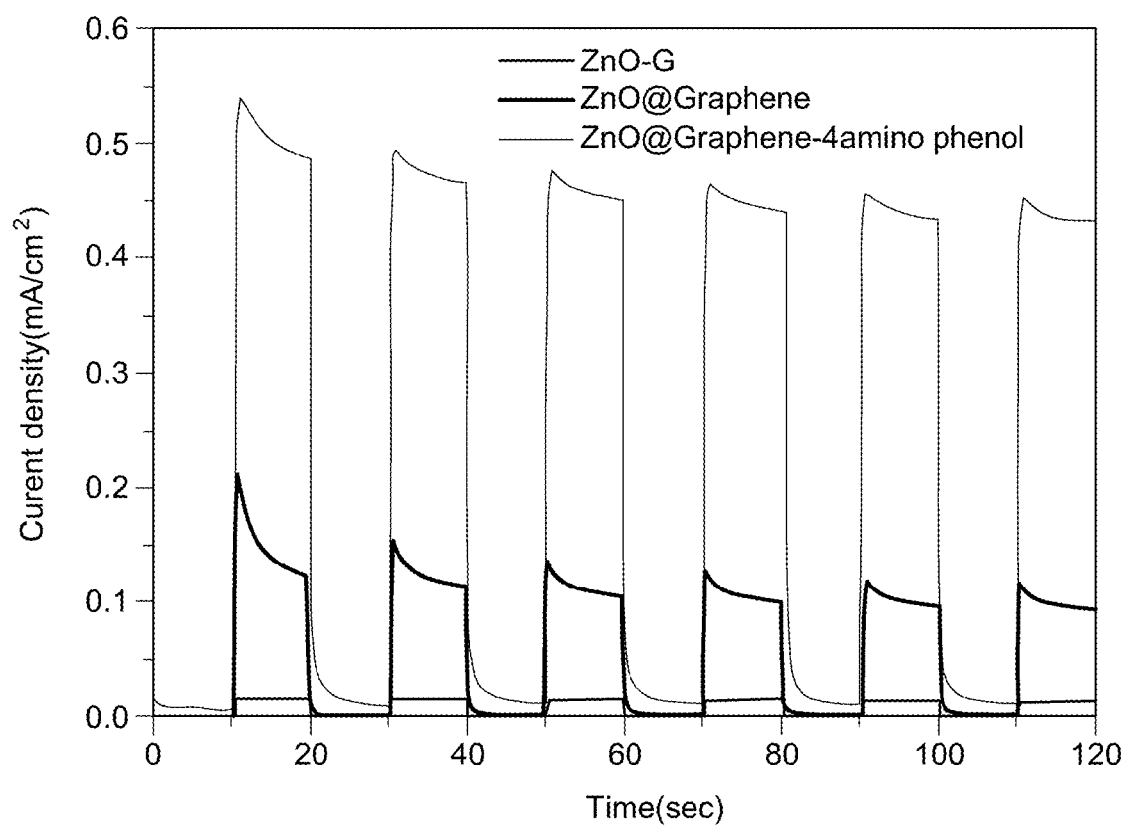
FIG. 5b shows a result of measuring photocurrent versus time under a constant voltage of 0 V (vs. Ag/AgCl) for a photoelectrochemical device wherein a microparticle in which a semiconductor-carbon nanomaterial quantum dot is self-assembled, prepared in Example 2 according to the present invention, is introduced into a photoelectrode.

FIG. 5b shows a result of measuring photocurrent versus time under a constant voltage of 0 V (vs. Ag/AgCl) for the photoelectrochemical device wherein the microparticle in which the semiconductor-carbon nanomaterial quantum dot is self-assembled was introduced into a photoelectrode. It can be seen that the zinc oxide-graphene core-shell structure exhibits better charge transport performance than zinc oxide and the microparticle structure surface-treated with the 4-aminophenol exhibits better charge transport performance than the core-shell structure.

Since the photocatalyst according to the present invention exhibits very superior photoconversion efficiency when used for a photoelectrochemical device, it can be used for various photocatalysts and photoelectrochemical devices and can also be used for solar cells.

In particular, the photocatalyst of the present invention can replace $TiO_2$ in photoelectrodes and can also be used for electrodes of secondary batteries and supercapacitors. Besides, it can be used for electrodes, active layers, charge transport layers, etc. in high-strength carbon composites, high-mobility thin-film transistors or solar cells.

The present invention is applicable to applications where the representative characteristics of a photocatalyst of generating oxygen radicals when exposed to light (especially UV light) and coordinating water molecules on its surface, i.e., photooxidation, superhydrophilicity, amphiphilicity, super-water repellency, etc. Specifically, it can be used for (large-scale, high-efficiency and nanoscale) preparation and evaluation of a photocatalyst. It can be used for preparation of photocatalyst sol and powder, hybrid photocatalyst, perovskite photocatalyst, etc. Also, it can be used in researches on glass, polymer, metal, ceramic, paper, fiber, optical fiber, etc. for fixing of photocatalysts and in research on photodegradation of organic matters, wastewater treatment, VOC treatment, antimicrobial application, air purification/deodorization, wet photochemical cell, water splitting, etc.

What is claimed is:

1. A photocatalyst comprising:
   a composite containing semiconductor-carbon nanomaterial core-shell composite quantum dots self-assembled into microparticles;
   wherein the quantum dots within the microparticles are interlinked together with 4-aminophenol in which amine and phenol groups of the 4-aminophenol respectively form amide and ester linkages with carboxylic groups of the carbon nanomaterial.

2. The photocatalyst according to claim 1, wherein the semiconductor is selected from ZnO, $WO_3$, $SnO_2$, $ZrO_2$, $TiO_2$, CdS, CdSe and CdTe.

3. The photocatalyst according to claim 2, wherein the semiconductor is ZnO or $TiO_2$.

4. The photocatalyst according to claim 1, wherein the carbon nanomaterial is selected from graphene, multi-layered graphene, carbon nanotube, and fullerene.

5. The photocatalyst according to claim 4, wherein the carbon nanomaterial is graphene.

6. The photocatalyst according to claim 1, further comprises a visible light absorbing material contained in the photocatalyst wherein the visible light absorbing material is selected from iron oxide, tungsten oxide, a cadmium complex, and bismuth vanadate.

7. The photocatalyst according to claim 6, wherein the visible light absorbing material is iron oxide.

8. The photocatalyst according to claim 6, wherein the visible light absorbing material is tungsten oxide.

9. The photocatalyst according to claim 6, wherein the visible light absorbing material is the cadmium complex.

10. The photocatalyst according to claim 6, wherein the visible light absorbing material is bismuth vanadate.

11. A photoelectrochemical device comprising:
    an electrode substrate;
    wherein the photocatalyst according to claim 1 is coated on the electrode substrate.

12. A solar cell comprising the photoelectrochemical device according to claim 11.

13. A photocatalyst comprising:
    a composite containing semiconductor-oxidized carbon nanomaterial core-shell quantum dots self-assembled into microparticles;
    wherein the quantum dots within the microparticles are interlinked together with 4-aminophenol in which amine and phenol groups of the 4-aminophenol respectively form amide and ester linkages with carboxylic groups of the oxidized carbon nanomaterial.

14. The photocatalyst according to claim 13, wherein the semiconductor is selected from ZnO, $WO_3$, $SnO_2$, $ZrO_2$, $TiO_2$, CdS, CdSe, and CdTe.

15. The photocatalyst according to claim 14, wherein the semiconductor is ZnO or $TiO_2$.

16. The photocatalyst according to claim 13, wherein the oxidized carbon nanomaterial is selected from oxidized graphene, oxidized graphite, oxidized carbon nanotube, and oxidized fullerene.

17. The photocatalyst according to claim 16, wherein the carbon nanomaterial is oxidized graphene.

18. The photocatalyst according to claim 13, further comprising a visible light absorbing material selected from iron oxide, tungsten oxide, a cadmium complex, and bismuth vanadate.

19. A photoelectrochemical device comprising:
an electrode substrate;
wherein the photocatalyst of claim 13 is coated on the electrode substrate.

20. A photocatalyst comprising:
a composite containing ZnO semiconductor-oxidized carbon nanomaterial core-shell quantum dots self-assembled into microparticles;
wherein the quantum dots within the microparticles are interlinked together with 4-aminophenol in which amine and phenol groups of the 4-aminophenol respectively form amide and ester linkages with carboxylic groups of the oxidized carbon nanomaterial; and
a cadmium complex visible light absorbing material contained in the ZnO semiconductor-oxidized carbon nanomaterial core-shell quantum dots.

* * * * *